INVENTORS
ROBERT M. BAUCOM
GEORGE J. HEIMERL

BY

ATTORNEYS

United States Patent Office 3,608,365
Patented Sept. 28, 1971

---

3,608,365
EXTENSOMETER FRAME
Robert M. Baucom, Hampton, and George J. Heimerl, Yorktown, Va., assignors to the United States of America as represented by the Administrator of the National Aeronautics and Space Administration
Filed Dec. 23, 1969, Ser. No. 887,699
Int. Cl. G01b 7/24
U.S. Cl. 73—88.5R          2 Claims

---

ABSTRACT OF THE DISCLOSURE

A transducer frame for accommodating a displacement transformer for continuous monitoring of extension of a specimen sample.

---

ORIGIN OF THE INVENTION

This invention was made by employees of the National Aeronautics and Space Administration and may be manufactured and used by or for the Government of the United States of America without the payment of any royalties thereon or therefor.

This invention relates to a structural frame for accommodating a displacement transformer for continuously monitoring of extension or contraction and subsequent strain measurement of a specimen sample. In the development and analysis of various structural materials for use in aerodynamic vehicles and the like it is imperative that the proposed material be tested for predictions of structural failure or fatigue under stress loads. One test that is always conducted for material samples of this type is an extension and/or contraction test to determine the strain or the change in length of a given section under the action of loading. Displacement transformers are normally used in these tests. Transformers of this type employ an electrical coil or windings having a known flow of current therethrough and a magnetic core which can move through the coil. When one end of a test section of a specimen is secured by an appropriate attachment point of the frame to the core and the other end of the test section of the speciment is secured at a second attachment point to the coil and a load applied to extend or contract the sample, there is relative movement between the coil and core. When the core moves or shifts with respect to the windings there is a change in the electrical output of the transformer which supplies a signal to a circuit including a readout indicator with the change in output indicating specimen strain and setting forth the load applied to the sample. Presently used structure for attaching the coil and core of the transformer have design features that lead to binding of the movement of the respective parts as the clamping pressure necessary to prevent slippage on the test specimen is increased.

It is therefore an object of the present invention to provide structure for attachment to the electrical coil and core of a transformer that is insensitive to the clamping pressure on the test specimen.

Another object of the present invention is a novel frame structure for a displacement transformer wherein the movable and stationary parts of the frame are maintained in continuous tension.

A further object of the present invention is a novel frame structure for a displacement transformer that avoids friction and binding of the parts during extension or contraction testing of a test specimen.

An additional object of the present invention is a frame structure for a displacement transformer that operates independent of the clamping pressure applied to a test specimen.

Another object of the present invention is the use of flexible connections between movable halves of a transducer frame to thereby maintain the halves in tension during relative movement thereof.

According to the present invention the foregoing and additional objects are attained by providing a transducer frame having a movable and a stationary frame section with flexure plates serving to suspend the movable section from the stationary section while permitting transverse motion of the movable section relative to the stationary section. Suitable knife edges are provided on each of the movable and stationary sections to permit the clamping of a test specimen thereto that is to be subjected to an extension test. A transformer body is secured to the stationary section and a magnetic core for the transformer is secured to the movable section. Thus, when an extension or contraction force is applied to the test specimen, the movable frame section attached thereto undergoes movement relative to the stationary section causing movement of the magnetic core relative to the coil of the transformer and a measurable change of current flow in the coil corresponding to the extension force applied to the test specimen.

A more complete appreciation of the invention and many of the inherent advantages thereof will be more clearly understood by reference to the following detailed description when considered with the accompanying drawings, wherein.

Figure 1:
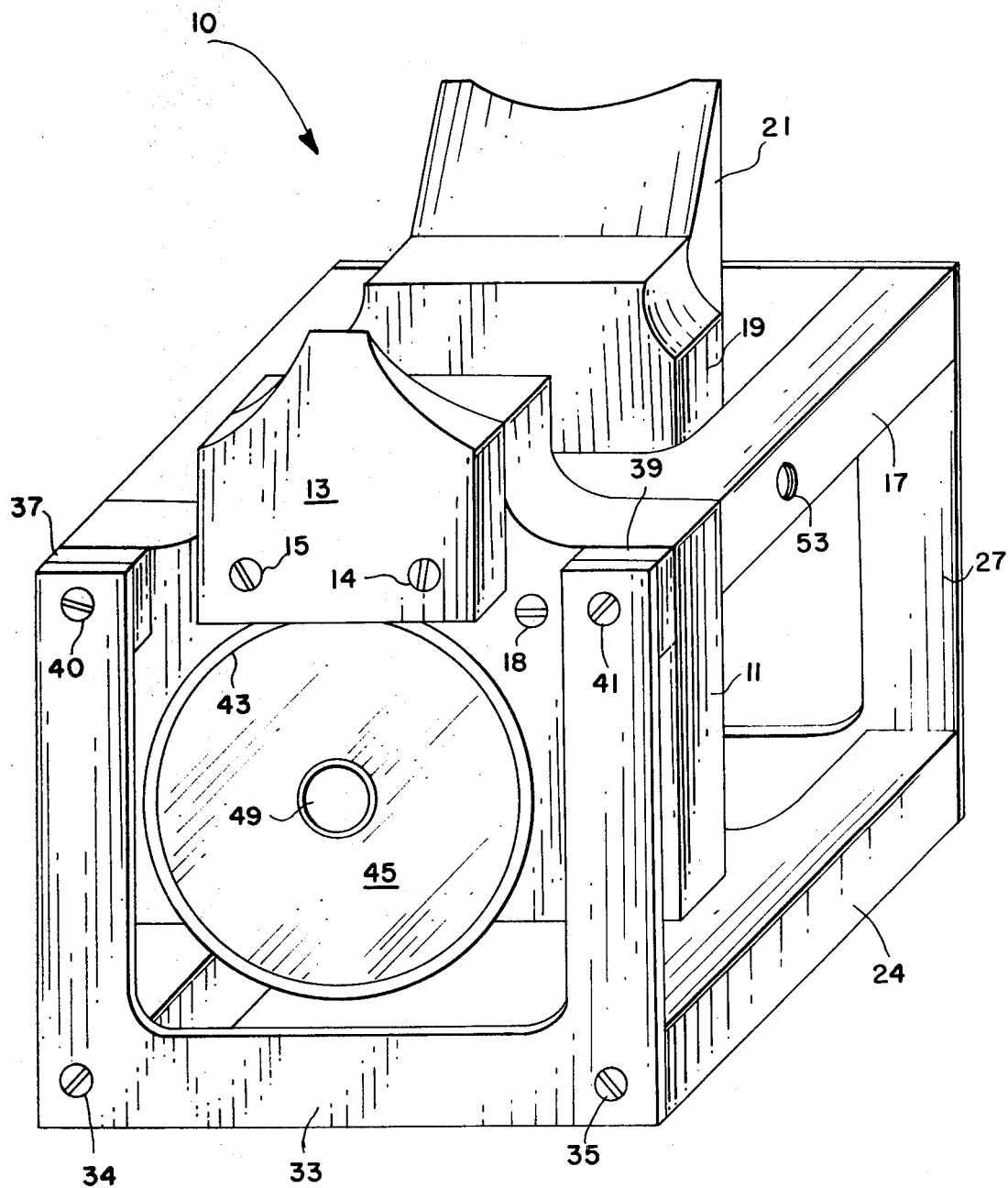
FIG. 1 is a perspective view of the transducer frame of the present invention.

Referring now to the drawings wherein like numerals designate identical or corresponding parts throughout the several views, and more particularly to FIG. 1, there is shown a transducer frame structure according to the present invention and, designated generally by reference numeral 10. Structure 10 includes a first vertical member 11 having a knife edge extension 13 integrally attached thereto by screws 14 and 15, as will be more fully described hereinafter. Vertical member 11 is also integrally attached to the base of a U-shaped horizontal member 17 by a plurality of screws, one of which is shown and designated by reference numeral 18 and by screw pair 40 and 41 as will be further explained hereinafter. A second vertical member 19 is received by the opening in the U-shaped horizontal member 17 and a second knife-edge extension 21 is secured to vertical member 19 by a plurality of screws, one of which is shown in phantom in FIG. 2 and designated by reference numeral 22. The base of vertical member 19 rests on the crossbar of an H-shaped horizontal member 24. Horizontal member 24 is parallel with and spaced from U-shaped horizontal member 17. A plurality of suitable screws, one of which is shown in phantom in FIG. 2 and designated by reference numeral 25, serve to integrally attach vertical member 19 to horizontal member 24. The H-shaped horizontal member 24 and U-shaped horizontal member 17 are maintained in spaced parallel relationship by a square flexure plate 27. Flexure plate 27 is secured at its corners to the ends of horizontal member 17 by way of screws 28 and 29 and the open end of horizontal member 24 by way of screws 30 and 31 as shown in FIG. 3. Referring back to FIG. 1, an additional flexure plate 33 of U-configuration is attached at its base to the other end of H-shaped horizontal member by way of screws 34 and 35. The open end of U-plate 33 is secured to a pair of flexure plate mounting blocks 37 and 39 and vertical member 11 by respective screws 40 and 41. Flexure plates 27 and 33 are formed of suitable spring stainless steel or the like while the remaining components described hereinbefore may be constructed of aluminum, magnesium or other suitable material.

Vertical member 11 is provided with an arcuate groove 43 in the base portion thereof for receiving the cylindrical housing of an electromagnetic motion responsive transformer 45. Transformer 45 contains a plurality of electrical windings or a coil as designated by reference numeral 47 in FIG. 2. A magnetic core 49 is disposed within transformer 45 and extends through the coil or windings 47. A suitable source of current is connected to flow through wires 16 to windings 47 in a conventional manner. Also, suitable readout equipment indicating the flow of current through windings 47 is connected thereto by wire pair 20 as is conventional in the art and is not further shown in the interest of clarity. Wires 16 and 20 have also been omitted in FIG. 1 in the interest of clarity. Magnetic core 49 is integrally attached to vertical member 19 by way of a suitable screw 51 (FIGS. 2 and 3), and accordingly, undergoes movement with vertical member 19.

Figure 2:
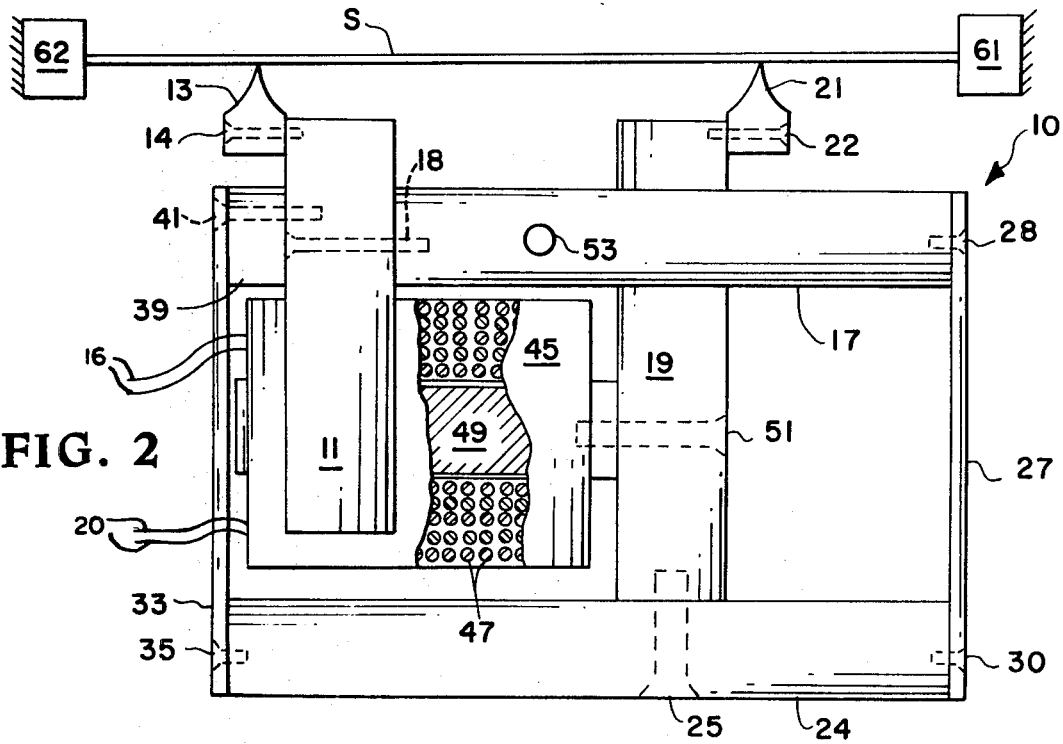
FIG. 2 is a side view, partly in section of the transducer frame shown in FIG. 1.
Figure 3:
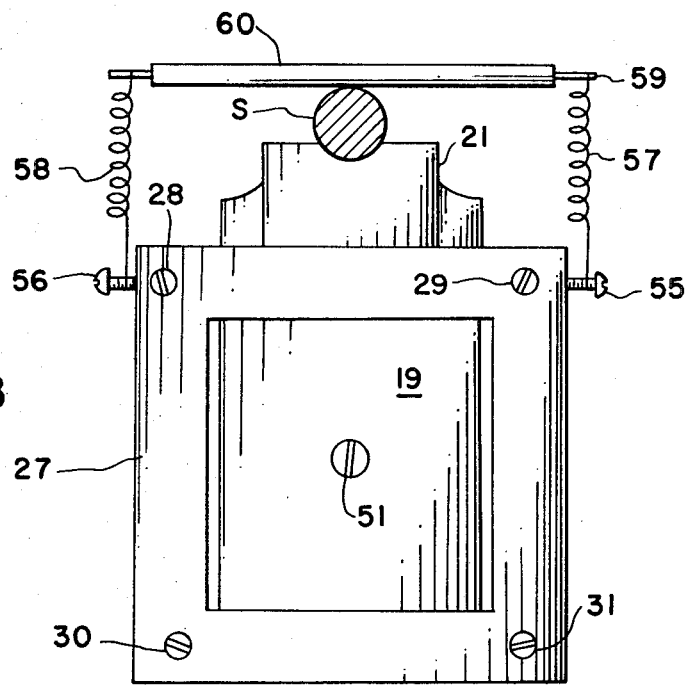
FIG. 3 is an end view of the transducer frame shown in FIG. 1 and FIG. 2.

Horizontal member 17 is provided with a pair of tapped openings, one on each of the sides thereof with the one being shown in FIGS. 1 and 2 designated by reference numeral 53 and the other not shown. As shown in FIG. 3 opening 53 and the one not shown serve to receive, respectively, a pair of screws 55 and 56. A pair of spring members 57 and 58 are attached to screws 55 and 56 and to a longitudinal bar 59 extending transversely across the test section of specimen sample S. Bar 59 is provided with a suitable protective sleeve 60 of rubber or the like to actually engage the specimen sample. This spring force of spring members 57 and 58 serve to clamp specimen sample S to knife edges 13 and 21 and horizontal member 17. Thus, horizontal member 17, vertical member 11, knife edge 13 and electrical coil housing 45 are stationary during an extension or contraction test of the test specimen. Similarly, horizontal member 24, vertical member 19, knife edge 21 and magnetic core 49 forms the movable half of frame 10. The movable half is suspended from the stationary half by the thin flexure plates 27 and 33 with the flexure plates permitting transverse movement of the movable half with respect to the stationary half but keeping the halves in tension and therefore preventing undue friction or binding of the parts during extension.

Operation

The operation of the invention is now believed apparent. No specific extension machinery or extensometer is shown or described since materials testing machines of this type are well known in the art. It is to be understood that the present invention is applicable with any type of test equipment used to determine strain of a test specimen in either the elastic portion of the specimen or in the plastic portion of the specimen and up to and including failure thereof or any combination thereof. In operation, a sample specimen S is clamped by conventional jaws 61 and 62 (FIG. 2) of a suitable extension or contraction machine with the test section of the sample in fixed engagement with knife edges 13 and 21. Springs 57 and 58 and bar 59 are then placed in the position shown in FIG. 3 to maintain the test section in contact with knife edges 13 and 21. With current flowing through windings 47, a force is then exerted on specimen S and, as this force causes the test section specimen S to deform, the movable half of frame 10 will undergo transverse movement relative to the stationary half. Due to the tension connection of the two halves by flexure plates 27 and 33 there remains essentially no friction or binding of the relatively movable parts regardless of the clamping pressure exerted on specimen S to prevent slippage thereof.

Although the invention has been described relative to a specific embodiment thereof, it is not so limited. For example, although the specimen sample is shown in FIG. 3 as round cross section, obviously samples of rectangular or other configuration are equally applicable in testing with the present invention. Also, in some instances, as in testing curved samples it may be desirable to utilize two frame structures 10 disposed on opposite sides of the test specimen. When utilizing two units springs 57 and 58 would be attached to the respective units and bar 59 omitted. Other variations and modifications of the invention will be readily apparent to those skilled in the art without departing from the spirit or scope of the invention in the light of the above teachings.

It is therefore to be understood that within the scope of the appended claims, the invention may be practised otherwise than as specifically described.

What is claimed as new and desired to be secured by Letters Patent of the United States is:

1. A transducer frame for accommodating a displacement transformer for continuous monitoring of extension or contraction of a specimen sample, comprising:
    a first vertical member;
    a second vertical member spaced from said first vertical member;
    knife edge extension means disposed on each of said first and second vertical members for supporting and maintaining in immovable position the test section of a specimen sample connected to an extension or compression test device for testing the sample extension or compression properties;
    a first horizontal member supporting and integrally attached to said first vertical member;
    a second horizontal member spaced from said first horizontal member and parallel therewith;
    said second horizontal member being integrally attached to said second vertical member;
    arcuate groove means formed within said first vertical member for receiving an electromagnetic motion responsive transformer;
    a cylindrical housing containing a plurality of electrical coils for receiving current flow positioned within said arcuate groove means;
    a magnetic core disposed within said housing and extending through said electrical coils;
    said core being integrally secured to said second vertical member;
    a pair of spaced parallel disposed flexible plate means;
    said pair of flexible plate means being integrally attached to both said first and said second horizontal members;
    means attached to said first horizontal member for securing said specimen in fixed relationship thereto; whereby
    when a sample specimen secured to said knife edge extension means on said vertical members is subjected to an extension or compression test, said second vertical member and the integrally attached second horizontal member will undergo limited movement relative to said first horizontal member and its integrally attached first vertical member causing said magnetic core to move within said electric coils to thereby produce a change in the output of current flowing in said coils relative to the strain of said specimen sample.

2. Apparatus for monitoring expansion or contraction properties of a specimen sample comprising, in combination:
    means for applying extension or compression forces to said sample specimen;
    first and second space means for supporting and maintaining a test section of said specimen that is to be tested for extension or contraction properties in an immovable position;
    electric coil means integral with said first means and having a flow of current therethrough;
    a magnetic core integral with said second means and slidably disposed within said electric coil;
    said first means being disposed in a fixed stationary position;

said second means being transversely movable relative to said first means;

said first means including a U-shaped horizontal frame member, a first vertical frame member integrally secured to said U-shaped frame member and a first knife edge extension integral with said first vertical frame member serving to engage one end portion of the test section of said sample specimen;

said second means including an H-shaped horizontal frame member, a second vertical frame integrally secured to said H-shaped horizontal frame member and a second knife edge extension integral with said second vertical frame member and serving to engage the other end portion of the test section of said sample specimen;

said apparatus further including clamping means for clamping said sample specimen in intimate engagement with said first and said second knife edge extension, said clamping means including a pair of spring members and a longitudinal bar member transversely disposed across the test section of the sample specimen, said spring members being attached to opposite ends of said bar member at one end thereof with the other end thereof being attached to structure extending from said U-shaped horizontal frame member to thereby hold the test section of the specimen sample in biased contact with said first and second second knife edge extensions, whereby when an extension or contraction force is exerted on the specimen sample said second means and its integral magnetic core will move relative to said first means and its integral electrical coil to thereby cause a detectable change in current flow in said coil proportional to the strain or change in length of the test section of said specimen sample.

References Cited

UNITED STATES PATENTS

| | | | |
|---|---|---|---|
| 2,189,775 | 2/1940 | Bleakney | 33—147(D) |
| 2,240,184 | 4/1941 | Hathaway | 73—88.5X |
| 2,588,630 | 3/1952 | Jackman | 73—88.5X |
| 2,921,282 | 1/1960 | Krouse et al. | 33—148(H)UX |
| 3,295,365 | 1/1967 | Larrigan et al. | 73—95 |

JERRY W. MYRACLE, Primary Examiner

U.S. Cl. X.R.

33—147D